United States Patent
Herley et al.

(10) Patent No.: US 6,748,100 B2
(45) Date of Patent: *Jun. 8, 2004

(54) DETECTION AND DETERRENCE OF COUNTERFEITING OF DOCUMENTS HAVING A CHARACTERISTIC COLOR

(75) Inventors: Cormac Herley, Los Gatos, CA (US); Xuguang Yang, Cupertino, CA (US); Poorvi Vora, Menlo Park, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,177

(22) Filed: Dec. 23, 1998

(65) Prior Publication Data

US 2001/0040993 A1 Nov. 15, 2001

(51) Int. Cl.[7] .................................................. G06K 9/00
(52) U.S. Cl. ........................ 382/135; 382/135; 382/137
(58) Field of Search ................................ 382/135, 137; 358/296, 300, 456, 457, 460

(56) References Cited

U.S. PATENT DOCUMENTS

| | | | | |
|---|---|---|---|---|
| 4,630,201 A | * | 12/1986 | White | 364/408 |
| 5,321,427 A | * | 6/1994 | Agar et al. | |
| 5,430,664 A | * | 7/1995 | Cargill et al. | 364/550 |
| 5,557,416 A | * | 9/1996 | Sasanuma et al. | 358/300 |
| 5,731,880 A | * | 3/1998 | Takaragi et al. | 358/296 |
| 5,796,869 A | | 8/1998 | Tsuji et al. | 382/203 |
| 5,960,103 A | * | 9/1999 | Graves et al. | 382/135 |
| 6,071,190 A | * | 6/2000 | Weiss et al. | 463/25 |

FOREIGN PATENT DOCUMENTS

EP   0779603 A2   6/1991
EP   0772343 A2   11/1991

OTHER PUBLICATIONS

European Search Report, Application No.: EP 99 31 0345; dated Apr. 9, 2001.

* cited by examiner

Primary Examiner—Leo Boudreau
Assistant Examiner—Abolfazl Tabatabai

(57) ABSTRACT

A method and apparatus is described for detection and deterrence of counterfeiting that permits one to make legitimate color copies without introducing visual artifacts or experiencing substantial processing delays. The scheme detects a characteristic color of frequently counterfeited documents and alters the characteristic color in the copies. The scheme exploits the fact that conversion between color spaces is frequently accomplished using a color Look-Up Table (LUT). Because it represents no computational burden to alter the values in the LUT, we can efficiently modulate slightly the value of the characteristic color in a way that depends on the value of the counter. For example, at first even banknote green is rendered correctly. However, as the page uses more and more of the ink, a modulation function causes conversion to a darker value than the actual green requested. After using a significant portion of the ink required to render a banknote, the modulation function can switch again, and cause a lighter than requested green to be returned. The net effect of using this modulation function is that distinct bands will appear when an image of a banknote is printed. These visible marks appear on the page independently of the orientation of the note. If we consider a general image with a lot of green, we find that there is no visible difference between versions of the image rendered with and without the modulation scheme. The reason for this is that although many pixels of the general image may meet the criterion of being classified as "banknote green" in the LUT, they are dispersed and a minor increase or decrease in the value is not as noticeable as when a large amount of that ink is used in close proximity, as is the case on the back of a banknote.

19 Claims, 6 Drawing Sheets

(2 of 6 Drawing Sheet(s) Filed in Color)

DETECTION AND DETERRENCE OF COUNTERFEITING OF DOCUMENTS HAVING A CHARACTERISTIC COLOR

BACKGROUND OF THE INVENTION

1. Field of the Invention

The present invention relates to printing and, more particularly, to the prevention of printing of counterfeit currency or other documents.

2. Description of the Related Art

Modern technology has made it easy for most people to quickly and inexpensively make accurate color copies of documents. This copying can be achieved through the use of a color copier or by scanning the document and then printing it using a color printer. There are many legitimate uses for this copying technology, however a small percentage of people use color copying to make counterfeit currency or to counterfeit other documents.

One way to prevent counterfeiting is to use techniques such as are taught by Sato, "Color image input apparatus having color image identifying function", U.S. Pat. No. 5,638,496, issued, Jun. 10, 1997. Sato describes a line sensor and image input section that input a color image in a reading area containing an original, an original extracting section that extracts an area of the original from the input image, a normalization section that normalizes an image of the extracted original area to an image of preset size, an image averaging section that converts the normalized image into an averaged image, and a brightness-hue-chroma converting section that converts the averaged image in Vcd images used as color perception amounts of a human being. A pattern matching section collates the Vcd image with dictionary data in a dictionary data storing section to determine whether or not the original is a specified type of original such as a bill, and an image output controlling section then determines whether or not image data output from the color image input section is to be output to the exterior based on the result of the identification.

Thus typical techniques such as searching for a particular pattern or color distribution can be used to detect and stop the copying of a counterfeit document. However, these techniques can be computationally intense and therefore place an undesirable delay on the copying of every document. This delay is particularly undesirable when one realizes that the majority of documents copied are made, not by counterfeiters, but by law-abiding citizens who are copying documents for legitimate purposes.

Thus, it can be seen that current counterfeiting detection and deterrence techniques impose processing delays upon color copying devices, and hinder the use of these devices in many applications.

Therefore, there is an unresolved need for a counterfeiting detection and deterrence technique that permits one to make color copies without imposing processing delays upon color copying devices.

SUMMARY OF THE INVENTION

A method and apparatus is described for detection and deterrence of counterfeiting that permits one to make legitimate color copies without introducing visual artifacts or experiencing substantial processing delays. The scheme detects a characteristic color of frequently counterfeited documents and alters the characteristic color in the copies.

Images are typically captured in one color space (such as RGB) and printed out in another color space (such as CMYK). The scheme exploits the fact that conversion between color spaces is frequently accomplished using a color Look-Up Table (LUT). For example, the back of U.S. notes are a characteristic "banknote" green. When rendering a page, a counter is increased each time an RGB triplet is converted to a part of the LUT that corresponds to "banknote green". Because it represents no computational burden to alter the values in the LUT, we can efficiently modulate slightly the value of the green in a way that depends on the value of the counter. For example, at first even banknote green is rendered correctly. However, as the page uses more and more of the ink, a modulation function causes conversion to a darker value than the actual green requested. After using a significant portion of the ink required to render a banknote, the modulation function can switch again, and cause a lighter than requested green to be returned. The net effect of using this modulation function is that distinct bands will appear when an image of a banknote is printed. These visible marks appear on the page independently of the orientation of the note.

If we consider a general image with a lot of green, we find that there is no visible difference between versions of the image rendered with and without the modulation scheme. The reason for this is that although many pixels of the general image may meet the criterion of being classified as "banknote green" in the LUT, they are dispersed and a minor increase or decrease in the value is not as noticeable as when a large amount of that ink is used in close proximity, as is the case on the back of a banknote.

Our invention has negligible impact on the time to render a page and negligible effect on general images and documents, while generating visible artifacts on banknote images. The scheme can be deployed in a printer driver with no hardware changes and the modulation function can be fine-tuned such that the area of the LUT that is classified as suspicious can be adjusted to arrive at a compromise that allows reasonable detection, while giving minimal effect on legitimate users. Furthermore, this method can detect the existing currency in circulation with no redesign or reissue of currency required. Moreover, so long as the characteristic color does not change, no alteration is required for a new series of notes.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–6C. Those skilled in the art will readily appreciate that the detailed description given herein with respect to these figures is for explanatory purposes, however, because the invention extends beyond these limited embodiments.

Figure 1:
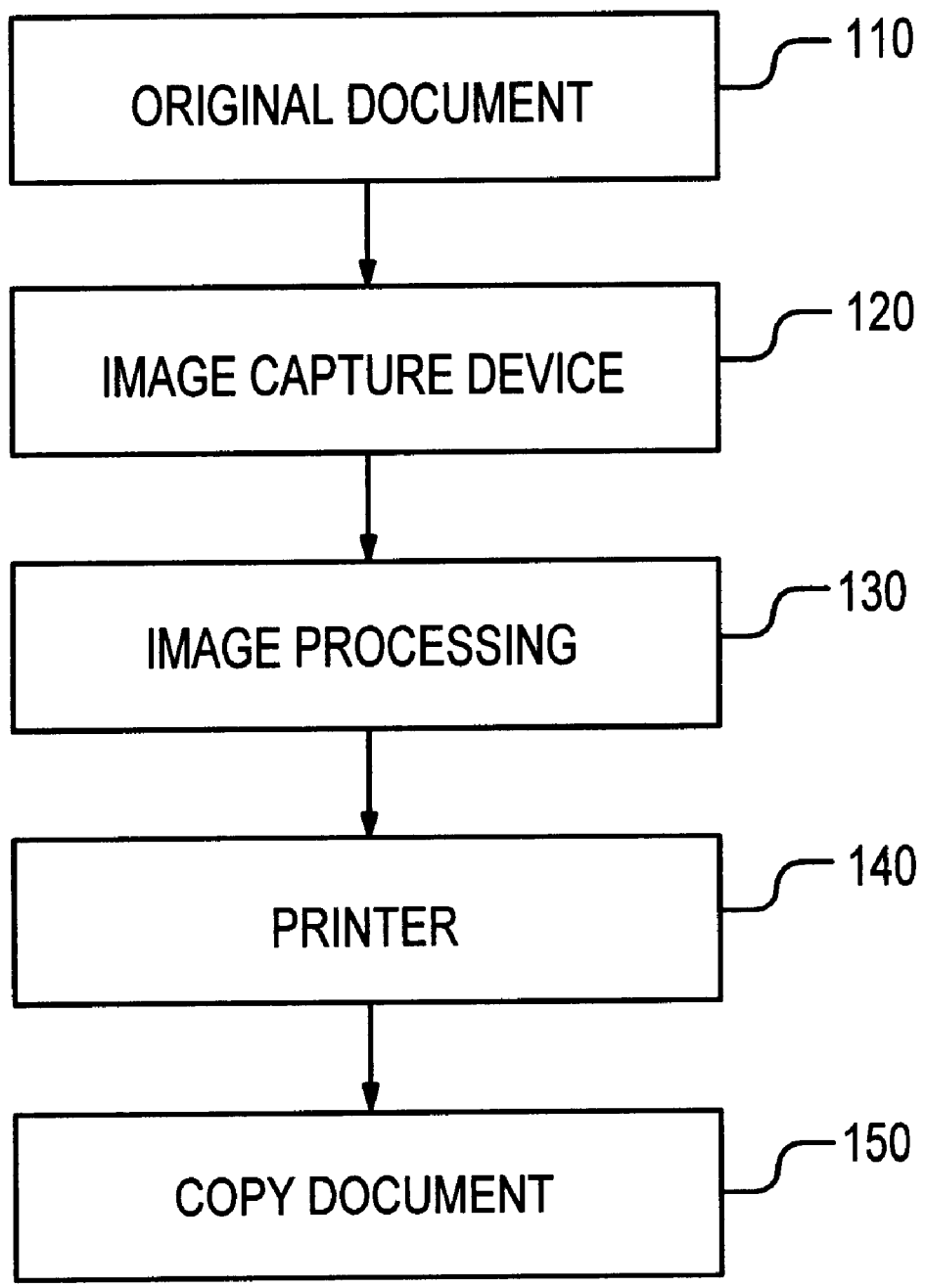
FIG. 1 is a diagram illustrating a color copying system suitable for use with a counterfeiting detection and deterrence scheme according to the present invention.

FIG. 1 is a diagram illustrating a color copying system suitable for use with a counterfeiting detection and deterrence scheme according to the present invention. Image capture device 120 captures an image of original document 1 10. Image processor 130 processes the image captured by image capture device 120 so that printer 140, can produce copy document 150. As will be explained below in greater detail, image processor 130 has the ability to detect a characteristic color (or colors) within the captured image of original document 110. In the event that a significant amount of a characteristic color is detected, image processor 130 will change the characteristic color so that a different color is printed by printer 140 when producing copy document 150. The changed characteristic color will thus identify a copy as being counterfeit.

A banknote is an example of a document having a characteristic color. For example, the back of all U.S. currency has a characteristic color, i.e., "banknote green". Other examples of documents that have a characteristic color and that may be targets of counterfeiters include: identification cards, bonds, or stock certificates.

Image capture device 120, image processor 130 and printer 140 may be separate components as shown in FIG. 1. Image capture device 120 can be a scanner or digital camera, but may also include a device that graphically generates the "captured" image. Image processor 130 can be a dedicated or general purpose computer, and the image processing function can be accomplished by software (for example as a printer driver), by hardware or by firmware. Printer 140 can function by any of a variety of known printing processes using mechanisms such as toner or ink. Alternately, one or more of these components can be combined, for example, as an integral color copier that scans, processes and then prints. Note also that it is possible for the image processing function 130 to be distributed throughout the system. Thus, a portion, or even all, of the image processing function 130 could be accomplished by the image capture device 120 or by the printer 140.

Figure 2:
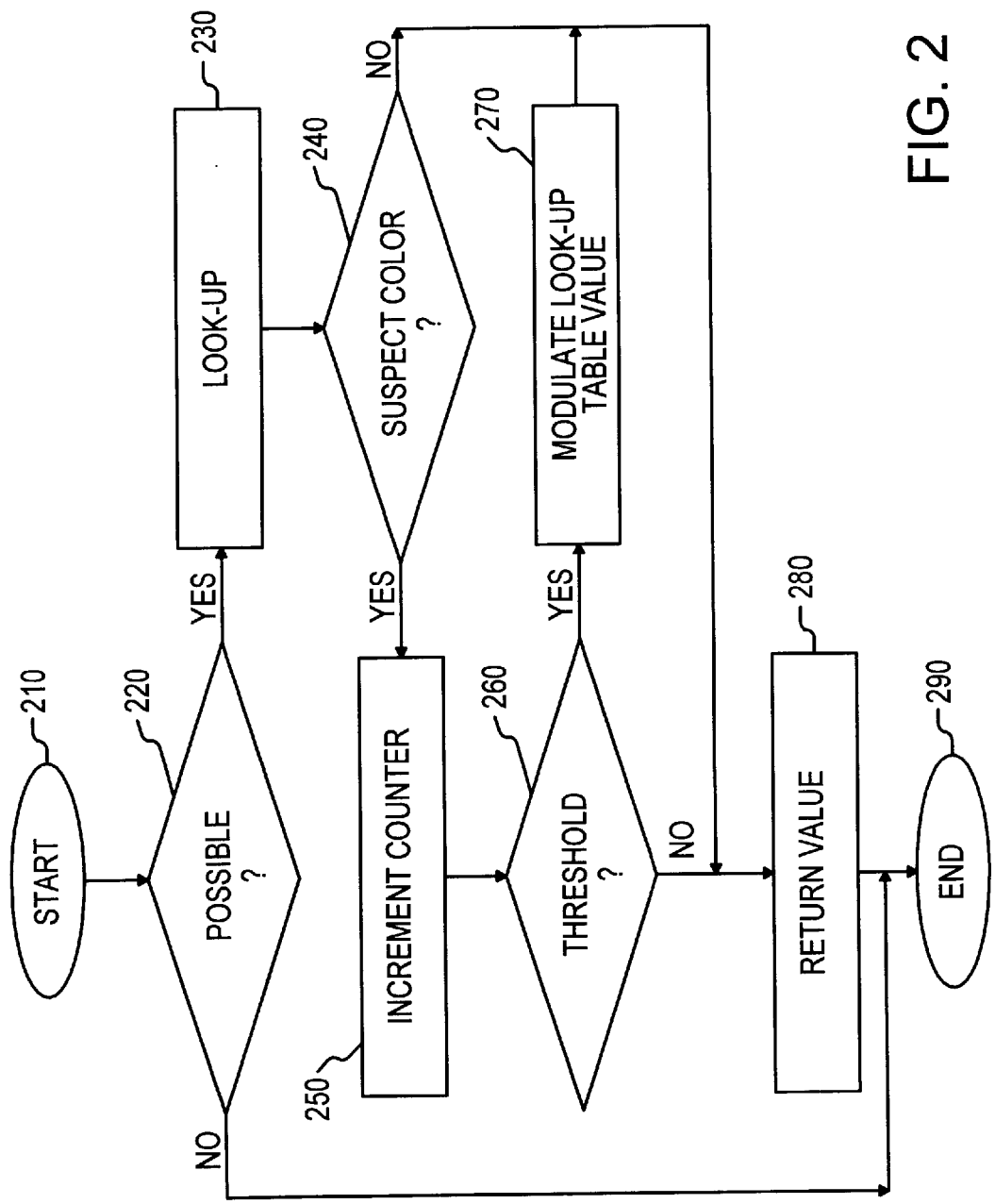
FIG. 2 is a diagram illustrating process flow according to an embodiment of the present invention.

FIG. 2 is a diagram illustrating process flow according to an embodiment of the present invention. The portion of image processing of interest begins at start bubble 210. At decision block 220, a test is made to determine whether or not counterfeiting of a document having a characteristic color is possible. For example, if it is known that the document being copied is to be printed as a black-and-white or grayscale copy, then it is not possible to generate a counterfeit copy of a document having a characteristic color. This is because the copy will not have the characteristic color, so there would be no chance of confusing the non-colored copy with an original. Therefore, to save processing time in a case such as just described, there would be no need to perform color conversion. Note that test 220 is optional and could be eliminated, with the only substantial effect being that processing would occur in every case, with an attendant increase in processing delay.

In process block 230 a color look-up is performed for the pixel of interest. That is to say that a color mapping is performed from one color space to another using a color look-up table. For example, an input device may record a captured document using the RGB (red-green-blue) color space, but the printer may print documents using the CMYK (cyan-magenta-yellow-black) color space. If the pixel of interest has a color represented in the RGB color space, a color look-up table (LUT) can be used to find the corresponding CMYK value.

A test is then performed in decision block 240 to determine whether or not the pixel of interest has a suspect color, i.e., a color that is the same or close to the characteristic color of the target counterfeit document. If the color look-up is for some color other than the characteristic color, then the pixel value for the printed image that has been obtained from the LUT is returned 280 and this portion of processing for the pixel of interest ends 290.

If it is determined in decision block 240 that the color look-up was for a color that is the same, or close to, the characteristic color, then a counter is incremented in process block 250. Based on the counter, a test is then performed in decision block 260 to determine whether or not a threshold number of pixels that correspond to the characteristic color have been identified. If the threshold has not been reached, then the pixel value for the printed image that has been obtained from the LUT is returned 280 and this portion of processing for the pixel of interest ends 290.

If it is determined in decision block 260 that the threshold has been reached, then the value (or values) in the look-up table that corresponds to the characteristic color is modulated as will be described below to cause an incorrect color to be printed in place of the characteristic color. Then the modulated pixel value for the printed image that has been obtained from the LUT is returned 280 and this portion of processing for the pixel of interest ends 290.

Thus, the scheme we have described falls in two parts:
  detection of suspicious events (e.g., detection of the use of banknote green in sufficient quantity); and
  action taken as a consequence of the suspicious event (e.g., modulation of the green color delivered in the printed copy).

The former part of this scheme permits detection of currency notes or other documents having a characteristic color during image processing, for example, by a printer driver. The latter part of this scheme permits one to easily mark copied documents to decrease the likelihood of counterfeiting.

Although explicit schemes to detect visible features on U.S. or other notes are very possible, these schemes can often be computationally demanding. In contrast, the present invention, through its use of look-up tables, places negligible computational load on the driver while allowing efficient detection and marking of attempted counterfeit notes.

Searching for visible features, such as the president's face, or the Treasury seal is a viable way of detecting currency. A problem is that the selected feature must be detected at any possible position and any possible angle. Searching for the feature can then take significant time. This generates considerable inconvenience for legal users, merely to obstruct the tiny percentage who may wish to counterfeit.

The present invention exploits the fact that the back of the U.S. notes are a characteristic green to identify these notes by detecting this green. Detection of this color would still not necessarily be a simple operation if it were carried out in RGB space. This is so, because one would have to explicitly calculate the distance of the color being rendered from "banknote green" and then determine if it were sufficiently close to be counted as suspicious. This distance would need to be calculated for each pixel (or at least for a large percentage of the pixels on the page).

Instead the present invention exploits the fact that the conversion from RGB to the CMYK used for printing is done in a Look-Up Table (LUT). It represents no computational burden to alter the values in an LUT.

To simply change the values in the LUT that correspond to "banknote green" to another color would clearly make the work of the counterfeiter difficult, but this would generally be unacceptable. There is every possibility that this green will occur in general images, and if one replaced the CMYK that corresponds to "banknote green" with some other color it would generate unacceptably visible artifacts in general images.

The present invention exploits the fact that although general images may have some pixels of a characteristic color such as "banknote green", they will seldom have large amounts of this color in close proximity. In fact, very seldom will a document use as much of that green as is required to print the back of a banknote.

In rendering a page, each time an RGB triplet is converted to a part of the LUT that corresponds to "banknote green" (or some other characteristic color), a counter is increased. One then modulates slightly the value of the green in a way that depends on the value of that counter.

Figure 3:
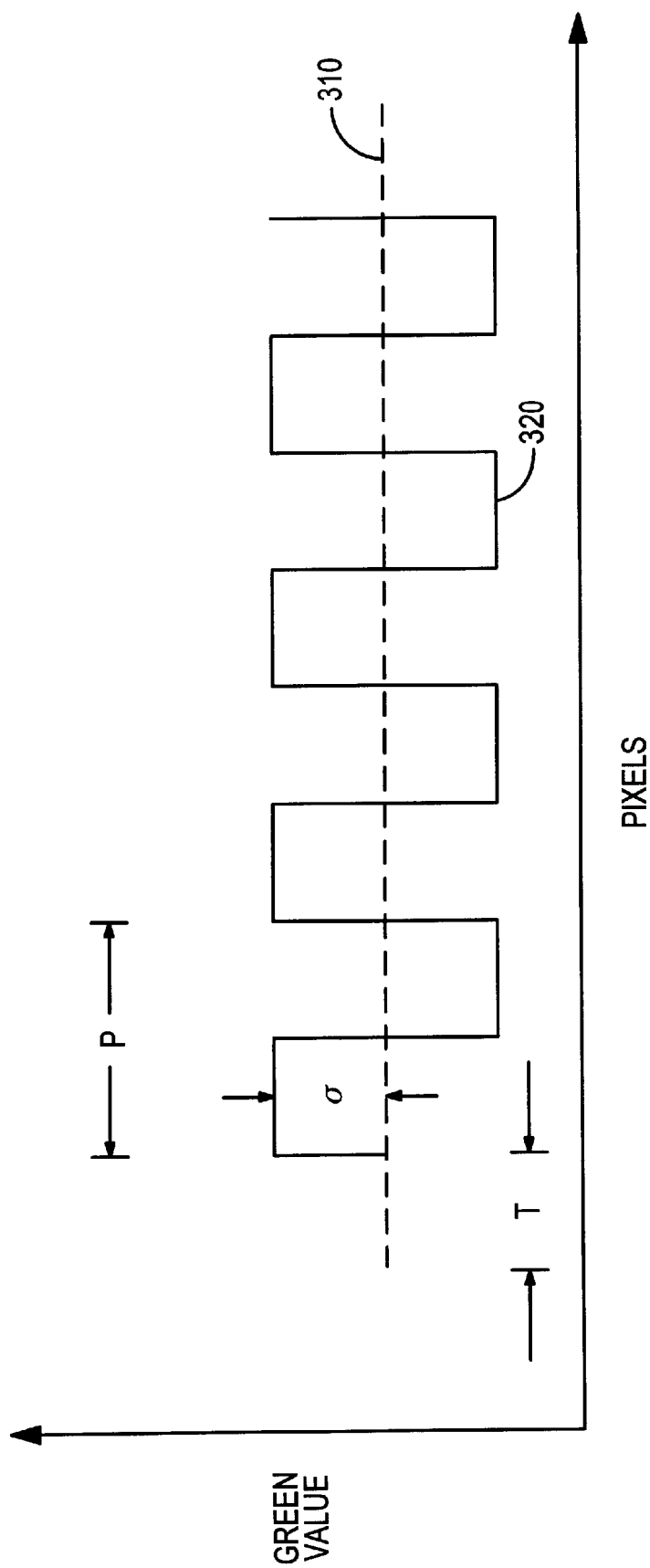
FIG. 3 is a diagram illustrating a color modulation function according to an embodiment of the present invention.
Figure 4:
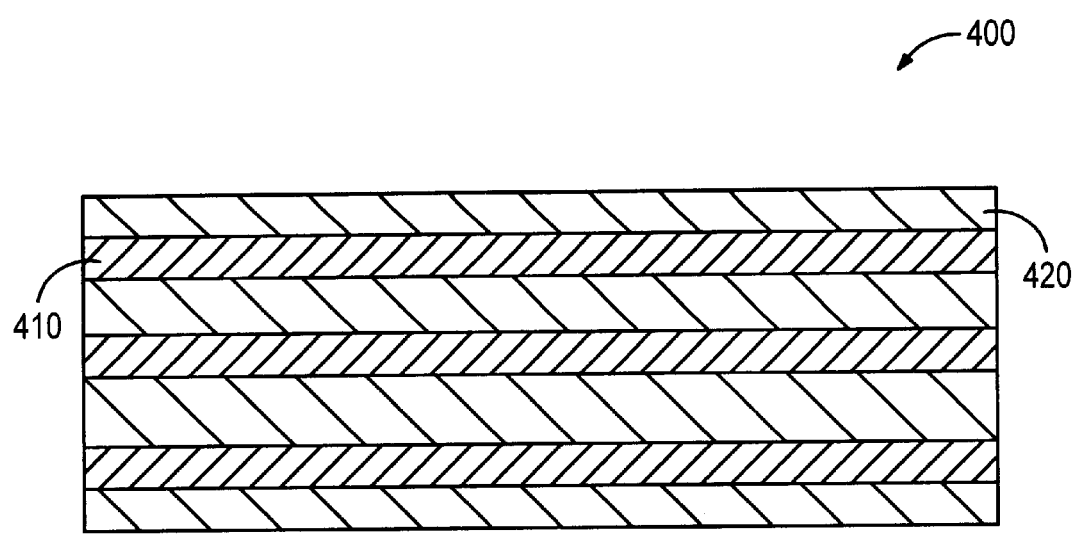
FIG. 4 is a diagram illustrating documents having a modulated color according to an embodiment of the present invention.
Figure 5:
FIG. 5 is a diagram illustrating currency having a modulated color according to an embodiment of the present invention.

For example if we use a modulation function as shown in FIG. 3, then at first even banknote green (i.e., dotted line 310) is rendered correctly, i.e., until threshold T is exceeded. As the page uses more and more of the ink however, the modulation function causes a darker value than the actual green requested. Thus, when threshold T is exceeded, amplitude δ is added to the green value. After using a significant portion of the ink required to render a banknote, the modulation function switches again, and causes a lighter than requested green to be returned. This can be repeated, with a period of P as shown in the "Square wave" modulation function 320. The net effect of using this modulation function is that distinct bands will appear when an image of a banknote is printed. This is shown in FIG. 4 wherein the finely shaded regions (e.g., 410) correspond to un-modulated regions in document 400 and the coarsely shaded regions (e.g., 420) correspond to regions that have had their color modulated. As depicted in FIG. 5, it can be seen that visible marks appear on the page independently of the orientation of the counterfeit notes.

Although a square wave modulation is shown in FIG. 3, other modulation schemes are possible. For example, the function could be a step, a ramp, a saw tooth, or sinusoidal. An advantage of a square wave is that there is no need to calculate a new modulation for each pixel. One merely changes the look-up table value each time the counter reached a particular number. Furthermore, in regions where there are a lot of pixels having the characteristic color, the transition from one modulation value to another will be very noticeable. This will make it easy to identify counterfeit notes. Further, the amplitude δ and period P, of the modulation function can be made to depend explicitly on the number of times the suspicious color has been used, or on the vertical or horizontal position on the page.

Furthermore, although the banknote is printed in a single color, when a banknote is scanned there will actually be a range of colors. This is because each pixel of the scanner falls either completely over the background yellow color, completely on the foreground green, or is divided between the two. If the pixel is divided between the two, the color should be a linear combination of those two colors. In addition there is the possibility, that instead of printing on white paper, a counterfeiter would print on yellow paper and would then alter the scanned note to make all colors a combination of white and green, rather than yellow and green. Both of these possibilities can be programmed into the suspicious region of the LUT space.

Note that should a counterfeiter prints more than one banknote on the same page, the visible stripes will appear on all of the notes, although the frequency may increase with the number of notes.

Figure 6A:
FIGS. 6A–C are diagrams illustrating images having a modulated color according to an embodiment of the present invention.
Figure 6B:
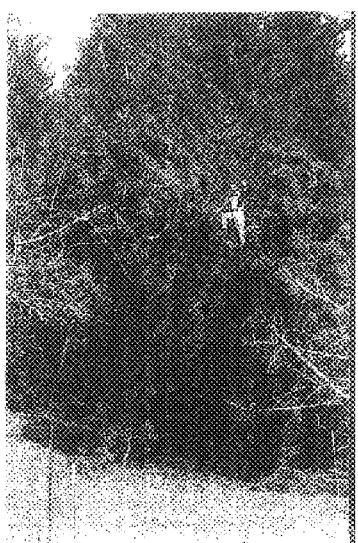
Figure 6C:

If we consider a general image with a lot of green, we notice that the effect of the method is minimal. FIGS. 6A–C are printed ordinary images having a modulated color according to an embodiment of the present invention. There is no visible difference between the versions of the image rendered without the proposed invention (FIG. 6A) and rendered with it (FIG. 6B). FIG. 6C shows the original image with the depicted suspicious colors shown in red. The reason the modulated colors of FIG. 6B are not visible is that although many pixels meet the criterion of being classified as "banknote green" in the LUT, they are dispersed and a minor increase or decrease in the value is not as noticeable as when a large amount of that ink is used in close proximity, as is the case on the back of a banknote.

To summarize, the present invention has the following advantages:

It causes negligible impact on time to render page.

It has negligible effect on general images and documents, while generating visible artifacts on banknote images.

It can be deployed in the driver with no hardware changes.

The modulation function can be changed or fine-tuned; e.g. T, δ and P in the example we have shown can be adjusted.

The area of the LUT that is classified as suspicious can be adjusted to arrive at a compromise that allows reasonable detection, while giving minimal effect on legitimate users.

No redesign or reissue of currency required. This method helps detect the existing currency circulation.

Furthermore, so long as the characteristic color does not change, no alteration is required for new series of notes.

It should be clear that one could use various different actions when a suspicious event is found. One could refuse all further function by stopping the rendering process. Alternatively, in contrast to prior methods which completely deny copying service upon detection of suspicious events, one could alter the printed image in a way that would not substantially degrade the fidelity of a copy of normal documents, but would substantially alter a copy of a secure document. One could substitute a totally different color for banknote green. One could cause a jitter to be inserted when a sufficient amount of banknote green is used. The last approach is described in a separate patent application, C. Herley and P.Vora, "Detection and Deterrence of Counterfeiting of Two-Sided Documents", filed on even date herewith. One could render the suspicious color at a resolution below the native resolution of the device. For example, render banknote green at 150 dpi rather than 600 dpi on a 600 dpi printer once a suspicious amount of this color has already been used.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus for deterring counterfeiting of documents having a characteristic color, the apparatus comprising:

a detector enabled to detect occurrences of look-up in a color look-up table of a specific look-up value that is assigned to pixels having a color corresponding to the characteristic color, the pixels being part of an image being processed, the color look-up table having a plurality of look-up values;

a counter operative associated with the detector to count the number of the occurrence of the look-up of the specific look-up value of the characteristic color during processing of the image; and a modulator that is responsive to the counter to selectively modulate the look-up value returned for the detected pixels that correspond to the occurrences of look-up of specific look-up value of the characteristic color such that selected occurrences result in a rendering of an output color that is perceptibly different than the characteristic color, wherein selective modulation by the modulator is based on the count of the occurrences of the specific look-up value of the characteristic color and is independent of the pixel locations and the density of the occurrences, the modulator being configured to inhibit the selective modulation before a threshold number of the occurrences of the look-up of the specific look-up value of the characteristic color is reached.

2. The apparatus as set forth in 1, wherein the modulator causes the modulation according to a modulation function.

3. The apparatus as set forth in 2, wherein the modulation function is a square wave function.

4. The apparatus as set forth in 1, further comprising a printer to print a rendering of the image.

5. The apparatus as set forth in 1, further comprising a capture device to capture the image.

6. The apparatus as set forth in 1, wherein the look-up table converts from a first color space value of the captured image to a second color space value of a rendering of the image.

7. The apparatus as set forth in claim 6, wherein the first color space value is an RGB value and the second color space value is a CMYK value.

8. A method for deterring counterfeiting of documents having a characteristic color, the method comprising the steps of:

detecting occurrence of a specific look-up in a color look-up table of pixels having a color corresponding to the characteristic color, the detected pixels being part of a captured image;

counting the number of the occurrences of the specific look-up for the captured image, the specific look-up corresponding to the characteristic color;

returning a look-up value for each of the occurrences of the specific look-up of the characteristic color; and modulating the look up value of the characteristic color returned for the detected pixels in response to determining that the number of the occurrences exceeds a threshold number such that renderings of the detected pixels in a rendering of the captured image are altered from the characteristic color to an output color that is noticeably different from the characteristic color, including maintaining the look-up value returned for each of the occurrences that are counted before the threshold number is exceeded, said modulating being initiated on a basis that is independent of densities of said occurrences.

9. The method as set forth in 8, wherein the modulation occurs after a threshold number of detections.

10. The method as set forth in 8, wherein the modulation occurs according to a modulation function.

11. The method as set forth in 10, wherein the modulation function is a square wave function.

12. The method as set forth in 8, wherein the look-up table converts from an RGB value of the captured image to a CMYK value of the captured image.

13. The method as set forth in 8, comprising the step of printing the captured image subsequent to modulating the look-up value.

14. The method as set forth in 8, comprising the step of capturing the captured image.

15. The method as set forth in 8, wherein the look-up table converts from a first color space value of the captured image to a second color space value of a document to be printed.

16. A method of deterring counterfeiting of documents that include a specific color, comprising the steps of:

capturing an image of a document, said captured image being comprised of a plurality of pixels;

counting suspect pixels without regard for the positions of the suspect pixels within said captured image and without regard to densities of the suspect pixels within said captured image, said suspect pixels being those pixels of said captured image which have a color matching said specific color; and altering a shade of said specific color in a reproduction of said captured image, said altering being determined by said density-independent count of said suspect pixels and being implemented such that said reproduction is distinguishable from said captured image to a naked human eye, said reproduction of said captured image including a modified color that is perceptibly different from said specific color.

17. The method of claim 16, wherein said step of altering the shade of said specific color includes modulating a look-up value returned from a look-up table for said specific color.

18. The method of claim 17, wherein said modulation occurs according to a predetermined modulation function.

19. The method of claim 17, wherein said look-up table converts from a first color space value associated with said captured image to a second color space value associated with said reproduction of said captured image.

* * * * *